March 19, 1940.   A. T. KVARNSTROM   2,194,045
WINDSHIELD WIPER MOTOR
Filed May 7, 1938   2 Sheets-Sheet 1

INVENTOR.
ALFRED T. KVARNSTROM
BY
Barnes, Kisselle, Laughlin & Raisch
ATTORNEYS

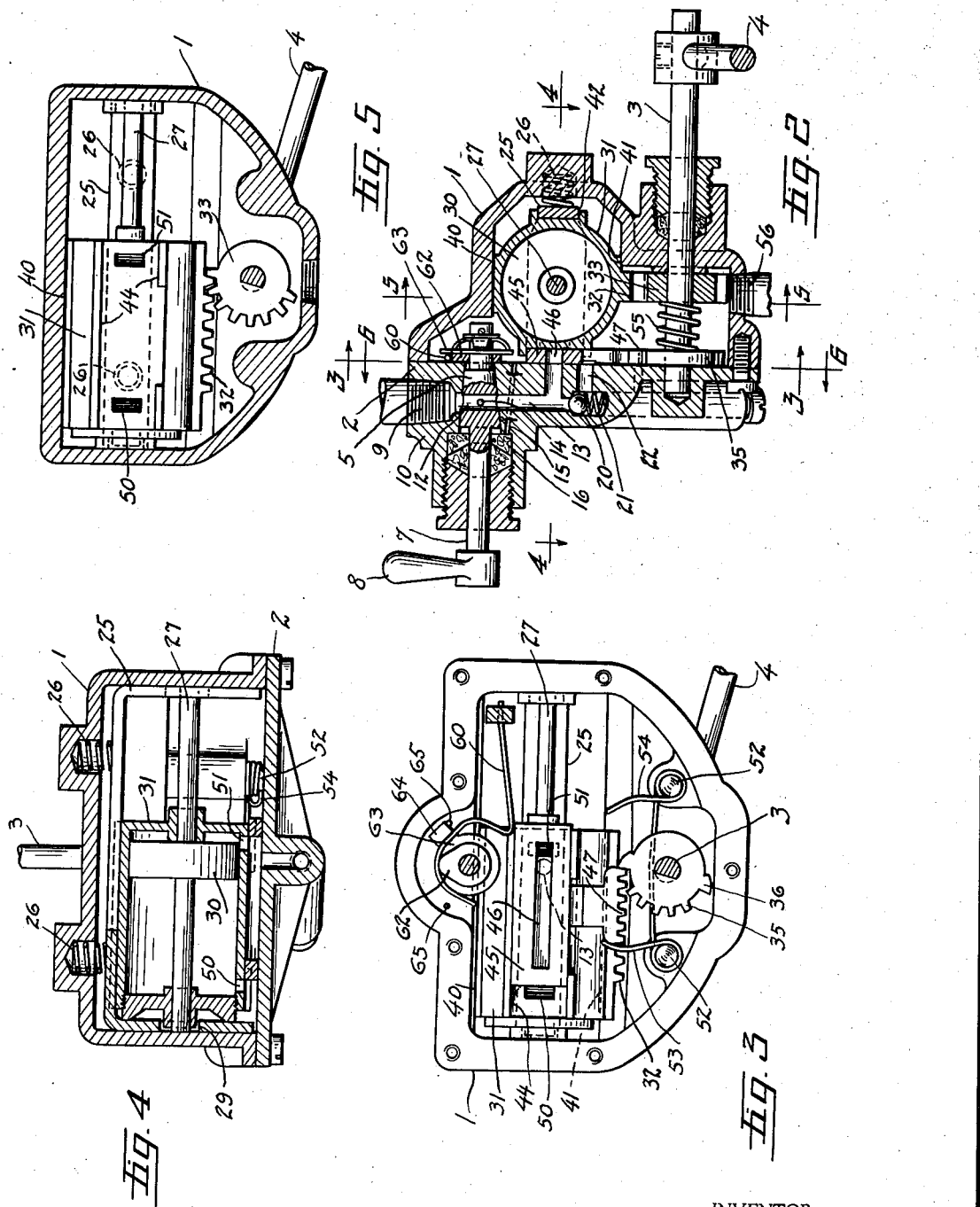

Patented Mar. 19, 1940

2,194,045

UNITED STATES PATENT OFFICE 2,194,045

WINDSHIELD WIPER MOTOR

Alfred T. Kvarnstrom, Detroit, Mich.

Application May 7, 1938, Serial No. 206,634

14 Claims. (Cl. 121—50)

This invention relates to a windshield wiper motor particularly for use with automotive vehicles or the like.

The invention is directed particularly towards an oscillating motor for rocking the shaft on a windshield wiper wherein power is derived from liquid pressure. It might be said that the motor is a hydraulic motor.

It has heretofore been the practice very largely to operate windshield wipers by a so-called vacuum motor connected to the intake manifold of an internal combustion engine. The present invention provides a motor more positive in action than a vacuum motor, one of which has great power and which will operate the wiper blade at a substantially uniform rate throughout all speed ranges of the engine. The vacuum motor often stops or fails when the depression in the intake manifold of an engine approximates atmospheric pressure, and very often this is just the time when the wiping action is most needed, because the vehicle is usually being accelerated at this time with the throttle widely opened.

Certain problems are involved, however, in a motor operating hydraulically, as does the one of the present invention, since special circumstances have to be taken care of, as for example, the taking care of excess liquid pressure which may occur due to some unforeseen cause. The present motor is arranged to be connected to the oil pumping system of an engine, and it is arranged in a novel way so as to act as a relief in the event excess pressure occurs. Moreover, all the operating parts operate in a chamber in the bath of oil which is on the return or low pressure side, to the end that the parts are well lubricated and will last indefinitely. A motor constructed in accordance with the invention is shown in the accompanying drawings.

Fig. 2 is a vertical section taken through the motor with parts shown broken away.

Fig. 3 is a sectional view taken substantially on line 3—3 of Fig. 2.

Fig. 4 is a sectional view taken substantially on line 4—4 of Fig. 2.

Fig. 5 is a sectional view with parts shown in elevation taken substantially on line 5—5 of Fig. 2 showing substantially one extreme position of some of the parts.

Figures 1, 6:
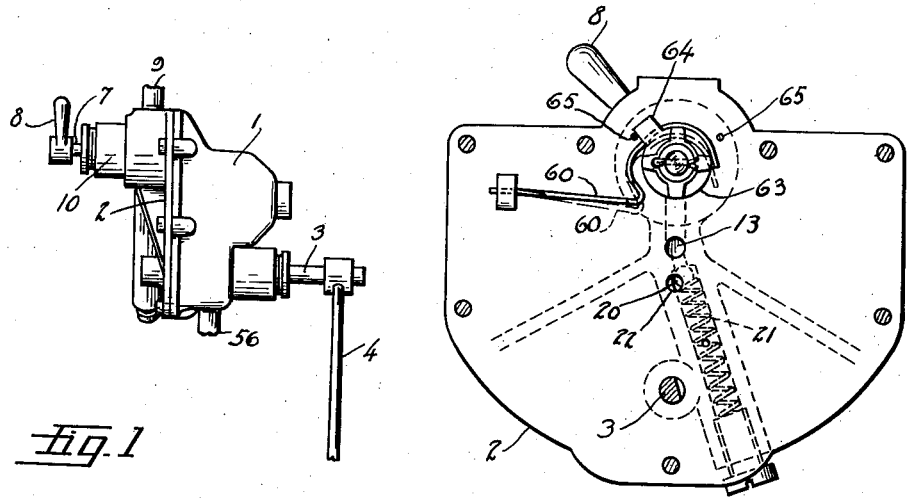
Fig. 1 is a side elevational view of the motor.
Fig. 6 is a view illustrating the inner face of a cover plate.
Figure 8:
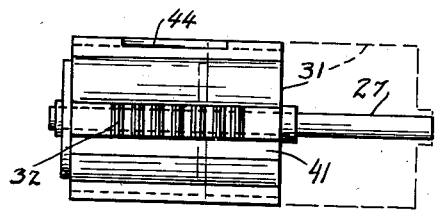
Fig. 8 is a view of a reciprocating cylinder.

In Fig. 1 the motor is illustrated as comprising a housing 1 with a cover plate 2, and the motor comprises a rock-shaft 3 upon which an arm 4 of a windshield wiper is to be mounted. A control valve has a stem 7 arranged to be controlled by a handle 8.

As shown in Fig. 2 the cover plate has an inlet port 9 which is arranged to be connected to the pump in the engine, which pumps the oil for lubrication purposes. The connection is made to the engine lubrication system at a point where the pressure is substantially constant throughout the range of engine operation. Of course, this connection could be made to any other source of liquid pressure. This can be termed the high pressure side of the pump. The cover plate has a valve housing 10 in which is located a plug valve 5 having a large port 12 arranged to be aligned with the passageway 13. The plug may also have a small port 14 for purposes which will presently appear. The cover plate is preferably provided with another small port 15 arranged to relieve high pressure to prevent leakage past the packing gland 16.

A check valve in the form of a spring pressed ball is illustrated at 20, the spring being at 21, situated between the passageway 13 and the passageway 22 leading to the inside of the casing 1. The high pressure comes into and through the passageway 13 and operates the motor, and from the motor the oil is discharged into the low side which includes the entire area within the casing 1.

Positioned within the casing is a U-shaped frame member 25, as illustrated in Fig. 4, urged toward the cover plate 2 by coil springs 26. A cross rod 27 fits quite snugly between opposite walls of the casing with its ends extending through apertures 29 in the frame, and this cross rod carries a fixed piston 30.

Reciprocably mounted on the rod 27 is a hollow cylinder 31. This cylinder has a rack 32, the gear teeth of which mesh with a gear 33 non-rotatably secured to the rock-shaft 3. Reciprocation of the hollow piston rocks the shaft and therefore the windshield wiper arm.

Figure 7:
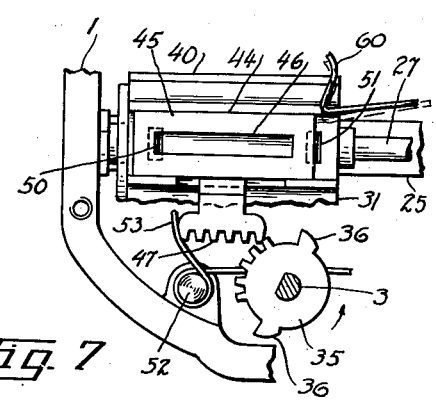
Fig. 7 is a detail view illustrating substantially one extreme position of some of the parts.

Non-rotatably secured to the shaft 3 is a partial gear 35 having, as shown in Figs. 3 and 7, abutments 36 spaced from the ends of the segmental gear teeth. This gear is for operating a control valve 45.

Figure 11:
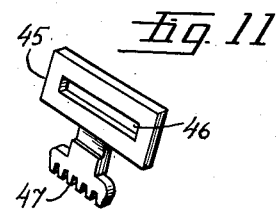
Fig. 11 is a perspective view of the valve plate.
Figure 9:
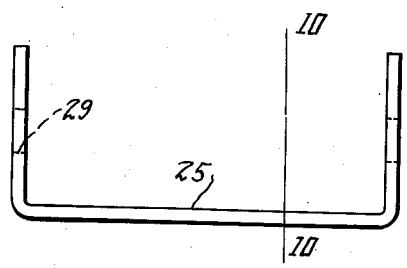
Fig. 9 is a view of a frame member used in the housing of the motor.
Figure 10:
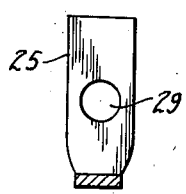
Fig. 10 is a cross sectional view taken substantially on line 10—10 of Fig. 9.

As will be seen by reference to Fig. 2, the reciprocating cylinder has a flat surface 40 on one side and a flat surface 41 on the other for sliding against the walls of the housing, and it is suitably shaped as at 42 with a channel formation for receiving the back bar of the frame 25. On the side opposite the frame 25 the cylinder has a channel formation 44 which slidably receives a valve illustrated in Fig. 11. The body portion of the valve, as illustrated at 45, is rectangular and is equipped with an elongated valve port 46, and an extension with rack teeth 47 which mesh with the gear teeth and partial pinion 35.

The cylinder has two ports therein as illustrated in Figs. 4 and 5, these ports being identified by the characters 50 and 51. The springs 26 urge the cylinder, and in fact the entire assembly comprising the U-frame, cylinder and piston, to the left as shown in Fig. 2, with the result that the valve plate is packed snugly between the back of the channel 44 of the cylinder and the inner face of the cover plate 2. The port 46 aligns with the inlet opening of the passageway 13.

It will be noted that as the piston reciprocates the partial gear 35 reciprocates and, therefore reciprocates the valve 45. The valve is arranged to be acted upon by one or more springs and such an arrangement is illustrated in Fig. 3 where a single length of spring wire stock has convolutions wrapped around posts 52 with opposite arms projecting as at 53 and 54 with the arms lying in the path of movement of the valve. The partial segment 35 may be of non-metallic substance such as fiber or a molded composition, although this is not essential, and it may be held against the face of the cover plate by a spring 55. The casing has an outlet 56 which leads back to the low side of the oil pump or, in other words, to the crank case of the internal combustion engine of the vehicle.

A detent 60 is carried by the cover plate, and it has a portion extending over or in proximity to the valve stem 7 to be engaged by a cam 62 secured to the valve stem. A member 63 may be secured to the valve stem which has a projection 64 operating between stops 65 for limiting manual shift of the plug valve. Operation of the plug valve also rocks the cam 62 for controlling the detent.

When the motor is in operation the liquid under high pressure enters the valve as illustrated in Fig. 5 and passes to passageway 13, and the outlet of passageway 13 is in alignment with the valve port 46. With the parts in position as shown in Fig. 4, the liquid under pressure enters port 51 of the cylinder and shifts the cylinder to the right as this view is considered. At this time the valve blocks off the port 50 as shown and spent liquid passes into the housing. As the cylinder moves to the right as Figs. 3, 4 and 5 are viewed, the shaft 3 is rotated and also the partial gear 35, and the gear 35 moves the valve along uniformly with movements of the cylinder. Near the end of the movement in the right hand direction, the spring arm 54 engages the valve and shifts the same to move the valve to the left (Fig. 3) relative to the cylinder to connect port 50 with the port 46 and to block off port 51 from the port 46 and connect port 51 to the interior of the housing. Then the cylinder moves to the left, with the valve plate moving uniformly with the cylinder by reason of the rocking movement of the partial gear 35. As the parts approach the limit of movement to the left, they assume a position substantially as illustrated in Fig. 7. The valve plate has engaged the arm 53 and flexed it, as illustrated, and ultimately the gear teeth on the partial pinion rock out of meshing engagement with the rack on the valve plate and the spring arm 53 snaps the valve back to the position shown in Figs. 3 and 4. The cycle has now been completed. In this snapping action the valve moves to the right, as Figs. 3 and 7 are viewed, until it strikes one of the abutments 36. Briefly reiterating, the piston and valve plate now move to the right until the valve plate flexes the arm 54, and the teeth of the gear segment 35 move out of mesh with the rack teeth on the valve when the arm 54 snaps the valve plate back to the left just as did the arm 53.

The liquid enters the cylinder under pressure on the so-called high side or high pressure side, which, as shown in Fig. 4, comprises passageway 13, port 46, port 51 and the right hand end of the cylinder. In movement of the cylinder to the right, the liquid is discharged from the left hand end of the cylinder into the housing, from where it drains back into the crank-case of the engine or to the low side of the pump. In reverse movement, the liquid is discharged through the port 51.

To discontinue the operation the valve is rotated through substantially 90°, or from the position shown in Fig. 6 to a position where the member 64 strikes the opposite stop 65. Previously, the cam 62 held the detent 60 out of the path of the valve plate. However, with this latter turning of the valve, the cam rocks and the inherent spring tendency of the detent 60 causes it to move against or into the path of the valve plate. The valve may be turned off in any position of the reciprocating cylinder, and the detent flexes downwardly in engagement, with the valve plate. When, however, the cylinder reaches one end of its movement, as for example, the left hand end as Figs. 3 and 7 are viewed, the detent snaps into a position in front of the valve plate as shown in Fig. 7. At this time, even though the teeth on the gear segment 35 shift out of engagement with the rack teeth 47, the valve plate is held from shifting due to the action of the spring 53, and therefore, its position, as shown in Fig. 7, is maintained.

When the valve 5 is turned off the small port 14 is positioned, so as to transfer oil under pressure through the port 14 into passageway 13, and, therefore, subsequent to the turning off of the valve 5 only a small amount of oil will be introduced, and this will cause a slow reciprocation until the parts reach the Fig. 7 position. At this time there will be a constant pressure, all the time the engine is operating, in the passageway 46, and in the left hand end of the cylinder (visualizing Fig. 7) to thus hold the cylinder and therefore the wiper arm at one end of the reciprocating path.

The construction of the motor is such that it operates itself as a relief valve. Suppose, for example, the pressure transmitted thereto is too high for any reason; this is transmitted to the face of the cylinder defined by the port 46, and this will cause the entire cylinder and piston assembly to shift against the action of the springs 26. This opens up the space occupied by the valve plate between the cylinder and the inner face of the cover plate so that the liquid under pressure readily escapes into the housing where it may drain back into the engine. The check valve 20 may or may not be used, inasmuch as the motor itself acts as a relief valve. Excess pressure will unseat the ball 20 so that the liquid may flow through the port 22 and into the housing 1. Ordinarily, however, such a check valve is not needed, as relief is afforded by the motor construction.

If the valve 5 has any tendency to leak to permit oil under pressure to have access to the packing gland 16, such oil as is drained off by the port 15 into the housing, and thence back into the engine crank-case or low side of the pump. This saves the packing gland from excessive pressure and effectively prevents leakage.

I claim:

1. A windshield wiper motor operable by liquid under pressure comprising a housing, a port in one wall of the housing for the introduction of liquid under pressure, a port in the housing for the discharge of spent liquid, a rocker shaft for a windshield wiper arm, means for rocking the shaft comprising an assembly of parts in the housing which includes a relatively movable cylinder and piston and a valve for controlling the introduction and discharge of liquid from the cylinder, means for holding the assembly against the said wall of the housing for establishing communication with the inlet port, said means arranged to allow movement of the assembly away from said wall of the housing so that liquid under pressure may discharge into the housing for relief of excess pressure.

2. A windshield wiper motor operable by liquid under pressure comprising a housing, a port in one wall of the housing for the introduction of liquid under pressure, a port in the housing for the discharge of spent liquid, a rocker shaft for a windshield wiper arm, means for rocking the shaft comprising an assembly of parts in the housing which includes a relatively movable cylinder and piston and a valve for controlling the introduction and discharge of liquid from the cylinder, spring means for urging the assembly against said wall of the housing to establish the fluid passageway from the first mentioned port to the cylinder, said spring means being stressed for shift of the assembly away from said wall of the housing incident to excess liquid pressure so that some of said liquid is discharged directly into the housing.

3. A windshield wiper motor operable by liquid under pressure comprising a housing, a port in one wall of the housing for the introduction of liquid under pressure, a port in the housing for the discharge of spent liquid, a rocker shaft for a windshield wiper arm, means for rocking the shaft comprising an assembly of parts in the housing which includes a relatively movable cylinder and piston and a valve for controlling the introduction and discharge of liquid from the cylinder, a frame member in the housing, at least one of the parts of said assembly being arranged to reciprocate between said wall of the housing and the frame, spring means acting upon the frame to urge said assembly into frictional sliding contact with the said wall of the housing for establishing communication with the said port, said assembly and frame being shiftable away from said wall by stress of the springs incident to excess liquid pressure whereby the liquid pressure is introduced directly from said port into said housing.

4. A windshield wiper motor operable by liquid under pressure comprising a housing, a port in one wall of the housing for the introduction of liquid under pressure, a port in the housing for the discharge of spent liquid, a rocker shaft for a windshield wiper arm, an axially fixed piston in the housing, a cylinder in which the piston is disposed and which is reciprocable in the housing, a port at each end of the cylinder, a valve plate movable with the cylinder and positioned between said wall of the housing and the cylinder and operable to alternately connect one cylinder port with the said port in the said one wall, and the other cylinder port to the interior of the housing, a pinion on the rocker shaft and a rack on the cylinder, the teeth of which engage with said pinion.

5. A windshield wiper motor operable by liquid under pressure comprising a housing, a liquid inlet port in one wall of the housing for the introduction of liquid under pressure, a port in another part of the housing for the discharge of spent liquid, a cylinder mounted for axial reciprocation in the housing and having a port at each end, an axially fixed piston in the cylinder, means operably connecting the cylinder and the rocker shaft whereby cylinder reciprocation rocks the shaft, a valve member positioned between one side of the cylinder and the said wall of the housing and having an elongated port therein, means for causing the valve member to reciprocate with the cylinder while the elongated port connects the liquid inlet port to the port at one end of the cylinder, with the port at the opposite end of the cylinder having communication with the interior of the housing, and means operable substantially at the ends of the path of reciprocation of the cylinder for shifting the valve plate to alternately connect ports in the cylinder to the liquid inlet port and to the interior of the housing.

6. A windshield wiper motor operable by liquid under pressure comprising a housing, a liquid inlet port in one wall of the housing for the introduction of liquid under pressure, a port in another part of the housing for the discharge of spent liquid, a cylinder mounted for axial reciprocation in the housing and having a port at each end, an axially fixed piston in the cylinder, means operably connecting the cylinder and the rocker shaft whereby cylinder reciprocation rocks the shaft, a valve member positioned between one side of the cylinder and the said wall of the housing and having an elongated port therein, means for causing the valve member to reciprocate with the cylinder while the elongated port connects the liquid inlet port to a port in one end of the cylinder, with the port in the opposite end of the cylinder having communication with the interior of the housing, means operable substantially at the ends of the path of reciprocation of the cylinder for shifting the valve plate to alternately connect the ports in the cylinder to the liquid inlet port and to the interior of the housing, said cylinder, piston and valve plate being bodily movable transverse of the axis, and spring means for urging the piston, cylinder and valve plate toward the said wall of the housing with the valve plate in frictional contact therewith.

7. A motor for a windshield wiper operable by liquid under pressure comprising a housing, a liquid inlet port in one wall of the housing for the introduction of liquid under pressure, another port in the housing for the discharge of spent liquid, a cylinder mounted for reciprocation in the housing, an axially fixed piston in the cylinder, a rocker shaft for a wiper arm, means rocking the shaft incident to reciprocation of the cylinder, a port near each end of the cylinder and opening through a side wall thereof, a valve plate between said side wall of the cylinder and the housing wall with the inlet port, an elongated port in the valve plate, a gear segment on the rocker shaft, a rack on the valve plate having teeth meshing with the gear segment for causing the valve plate to shift with the cylinder, abutments on the gear segment spaced from the teeth thereon, the teeth of the rack and gear segment being arranged to disengage adjacent each end of the reciprocable movement, and spring means engaging the valve plate at each end of the reciprocable movement for shifting the same relative to the cylinder to cause the elongated port to alternately connect the port at one end of the cylinder with the liquid inlet and the port at the opposite end of the cylinder to the interior of the housing.

8. In a windshield wiper motor operable by liquid pressure, reciprocating motor parts including a cylinder, a shaft rocked by the reciprocable movements, a gear segment on the shaft having abutments spaced from the ends of the gear teeth, a valve plate having a gear rack for cooperation with the gear segment whereby rocking movement of the shaft shifts the valve plate with the reciprocabe motor parts, a spring arranged to be engaged by and flexed by the valve plate near each end of the reciprocable movement, the gear teeth on the gear segment and rack arranged to disengage each other substantially at the end of the reciprocable movement, and said spring means arranged to shift the valve plate relative to the said motor part, said shiftable movement being stopped by said abutments, said valve plate being ported for alternately connecting liquid under pressure to opposite ends of the cylinder.

9. In a windshield wiper motor operable by liquid pressure, reciprocating motor parts including a reciprocable cylinder, a shaft rocked by the cylinder, a gear segment on the shaft having abutments spaced from the ends of the gear teeth, a valve plate having a gear rack for cooperation with the gear segment whereby rocking movement of the shaft shifts the valve plate with the cylinder, a spring arranged to be engaged by and flexed by the valve plate near each end of the reciprocable movement, the gear teeth on the gear segment and rack arranged to disengage each other substantially at the end of the reciprocable movement, and said spring means arranged to shift the valve plate relative to the said cylinder, said shiftable movement being stopped by said abutments, said valve plate being ported for alternately connecting liquid under pressure to opposite ends of the cylinder.

10. In a windshield wiper motor operable by liquid pressure, reciprocating motor parts including a reciprocable cylinder, a shaft rocked by the cylinder, a gear segment on the shaft having abutments spaced from the ends of the gear teeth, a valve plate having a gear rack for cooperation with the gear segment whereby rocking movement of the shaft shifts the valve plate with the cylinder, a spring arranged to be engaged by and flexed by the valve plate near each end of the reciprocable movement, the gear teeth on the gear segment and rack arranged to disengage each other substantially at the end of the reciprocable movement, and said spring means arranged to shift the valve plate relative to the said cylinder, said shiftable movement being stopped by said abutments, the cylinder having a port near each end, said valve plate having an elongated port for alternately moving into registry with one port in the cylinder and out of registry with the other port in the cylinder incident to its movement by the spring means.

11. In a windshield wiper motor operable by liquid pressure, reciprocating motor parts including a reciprocable cylinder, a shaft rocked by the cylinder, a gear segment on the shaft having abutments spaced from the ends of the gear teeth, a valve plate having a gear rack for cooperation with the gear segment whereby rocking movement of the shaft shifts the valve plate with the cylinder, a spring arranged to be engaged by and flexed by the valve plate near each end of the reciprocable movement, the gear teeth on the gear segment and rack arranged to disengage each other substantially at the end of the reciprocable movement, and said spring means arranged to shift the valve plate relative to the said cylinder, said shiftable movement being stopped by said abutments, said valve plate being ported for alternately connecting liquid under pressure to opposite ends of the cylinder, a control valve for controlling the supply of liquid under pressure, a detent operably associated with the control valve for blocking the valve plate against movement by the spring means at one end of the reciprocable movement when the control valve is positioned to substantially discontinue the supply of liquid under pressure.

12. In a windshield wiper motor operable by liquid pressure, reciprocating motor parts including a reciprocable cylinder, a shaft rocked by the cylinder, a gear segment on the shaft having abutments spaced from the ends of the gear teeth, a valve plate having a gear rack for cooperation with the gear segment whereby rocking movement of the shaft shifts the valve plate with the cylinder, a spring arranged to be engaged by and flexed by the valve plate near each end of the reciprocable movement, the gear teeth on the gear segment and rack arranged to disengage each other substantially at the end of the reciprocable movement, and said spring means arranged to shift the valve plate relative to the said cylinder, said shiftable movement being stopped by said abutments, said valve plate being ported for alternately connecting liquid under pressure to opposite ends of the cylinder, a control valve for controlling the supply of liquid under pressure, a detent for the valve plate, means movable with the control valve for holding the detent ineffective when the valve is positioned for substantially full supply of liquid under pressure, and arranged to render the detent effective for blocking the valve plate against movement in one of its extreme positions when the control valve is positioned for a substantial discontinuance of the liquid under pressure.

13. A windshield wiper motor operable by liquid under pressure comprising, a housing, an inlet port for liquid under pressure, an outlet port for spent liquid, a motor comprising a cylinder and piston disposed in the housing, a rocker shaft arranged to be rocked by reciprocable movements of a motor part, valve means for introducing liquid under pressure to the motor for reciprocating a motor part and for the discharge of spent liquid from the motor into the housing, said valve means and motor being shiftable in a direction transverse of the reciprocable motor movements, incident to excess liquid pressure, for the discharge of liquid under pressure directly into the housing.

14. In a windshield wiper motor operable by liquid under pressure, a supply line for liquid under pressure, a motor having a movable part shiftable by liquid under pressure, a rocker shaft for a wiper arm rocked by said motor, valve means movable with and relative to the movable motor part for shifting the flow of liquid under pressure to cause reciprocable movements of the motor part, a control valve in the supply line having a relatively large port which is open in operating position and having a relatively small port which is open in inoperative position, means for operating the control valve and means operably associated with the control valve and operable upon movement of the control valve to inoperative position to lock the first mentioned valve in a fixed position to stop movements of the motor at one end of its reciprocable movement, said small port serving to furnish a small quantity of liquid under pressure to hold the reciprocable motor part at one end of its reciprocable movement.

ALFRED T. KVARNSTROM